(12) United States Patent
Bradski et al.

(10) Patent No.: US 6,396,476 B1
(45) Date of Patent: May 28, 2002

(54) SYNTHESIZING COMPUTER INPUT EVENTS

(75) Inventors: Gary R. Bradski, Palo Alto; Ryan A. Boller, Greensburg, both of PA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/204,007

(22) Filed: Dec. 1, 1998

(51) Int. Cl.[7] .................................................. G09G 5/08
(52) U.S. Cl. ...................................... 345/157; 345/156
(58) Field of Search ................................ 345/156, 157, 345/158, 160, 161, 162, 163, 169, 173, 7, 8, 9

(56) References Cited

U.S. PATENT DOCUMENTS

| | | | |
|---|---|---|---|
| 5,148,477 A | 9/1992 | Neely et al. | 382/6 |
| 5,287,437 A | 2/1994 | Deering | 395/127 |
| 5,327,161 A | 7/1994 | Logan et al. | 345/157 |
| 5,343,390 A | 8/1994 | Doi et al. | 392/132 |
| 5,394,202 A | 2/1995 | Deering | 353/7 |
| 5,446,834 A | 8/1995 | Deering | 395/127 |
| 5,751,836 A | 5/1998 | Wildes et al. | 382/117 |
| 5,801,704 A * | 9/1998 | Oohara et al. | 345/157 |
| 5,802,220 A | 9/1998 | Black et al. | 382/276 |
| 5,805,165 A | 9/1998 | Thorne, III et al. | 345/348 |
| 5,805,733 A | 9/1998 | Wang et al. | 382/232 |
| 5,923,776 A | 7/1999 | Kamgar-Parsi | 382/173 |
| 5,926,568 A | 7/1999 | Chaney et al. | 382/217 |
| 5,936,610 A * | 8/1999 | Endo | 345/157 |
| 6,009,210 A | 12/1999 | Kang | 382/276 |
| 6,028,960 A | 2/2000 | Graf et al. | 382/203 |
| 6,070,003 A | 5/2000 | Gove et al. | 710/132 |
| 6,097,839 A | 8/2000 | Liu | 382/181 |
| 6,111,517 A | 8/2000 | Atick et al. | 340/825.34 |
| 6,127,990 A * | 10/2000 | Zwern | 345/158 |

OTHER PUBLICATIONS

"Workshop on Perceptual User Interfaces", The Banff Rocky Mountain Resort, Banff, Alberta, Canada http://research.microsoft.com/PUIWorkshop97/, 1 p., (Oct. 20–21, 1997).*

Bradski, G.R., et al., "Computer Vision Modules for Game Interfaces and in Virtual Holography", *Worshop on Perceptual User Interfaces*, Banff, Alberta, Canada, pp. 10–13, (Oct. 19–21, 1997).*

(List continued on next page.)

*Primary Examiner*—Xiao Wu
(74) *Attorney, Agent, or Firm*—Schwegman, Lundberg, Woessner & Kluth, P.A.

(57) ABSTRACT

Synthesizing computer input events is disclosed. In one embodiment, a computerized system includes a sensor, a controller, a utility and an application. The sensor detects external events, such as audio events and video events. The controller generates control variables in response to the external events. The utility synthesizes input events, such as joystick, mouse, and keyboard events, from the control variables. The application then utilizes these input events.

27 Claims, 3 Drawing Sheets

OTHER PUBLICATIONS

Cutler, L.D., et al., "Two-Handed Direct Manipulation on the Responsive Workbench", Symposium on Interactive 3D Graphics, pp. 107–114, (1997).*

Freeman, W.T., et al., "Computer Vision for Computer Games", Proceddings of the Second International Conference on Automatic Face and Gesture Recognition, Killington, VT, pp. 100–105, (Oct. 14–16, 1996).*

Parker, J.R., Algorithms for Image Processing and Computer Vision, John Wiley & Sons, Inc., pp. 241–243, (1997).*

Ward, M., et al., "A Demonstrated Optical Tracker with Scalable Work Area for Head–Mounted Display System", Proceedings of the Symposium on Interactive 3D Graphics, Cambridge, MA, pp. 43–52, (1992).*

Bradski, G.R., "Computer Vision Face Tracking For Use in a Perceptual User Interface", *Intel Technology Journal Q2*, 1–15, (1998).

Cheng, Y., "Mean Shift, Mode Seeking, and Clustering", *IEEE Transactions on Pattern Analysis and Machine Intelligence*, 17, Published by the IEEE Computer Society, 790–799, (Aug. 1995).

Comaniciu, D., et al., "Robust Analysis of Feature Spaces: Color Image Segmentation", 1997 IEEE Computer Society Conference on Computer Vision and Pattern Recognition, San Juan, Puerto Rico, 750–755, (Jun. 17–19, 1997).

Cutler, R., et al., "View–based Interpretation of Real–time Optical Flow for Gesture Recognition", Int. Conf. on Automatic Face and Gesture Recognition, 416–421 (1998).

Davis, J.W., et al., "The Representation and Recognition of Human Movement Using Temporal Templates", 1997 IEEE Computer Society Conference on Computer Vision and Pattern Recognition, San Juan, Puerto Rico, 928–934, (Jun. 17–19, 1997).

Freeman, W., et al., "Computer Vision for Interactive Computer Graphics", *IEEE Computer Graphics and Applications*, pp. 42–53, (May/Jun. 1998).

Fukunaga, K., "Introduction to Statistical Pattern Recognition", 2nd Edition, Academic Press, Inc., Harcourt Brace Jovanovich, Publishers, (Copyright, 1990).

Funt, B.V., et al., "Color Constant Color Indexing", IEEE Transactions on Pattern Analysis and Machine Intelligence, 17, Published by the IEEE Computer Society, 522–529, (May 1995).

Nagao, K., "Recognizing 3D Objects Using Photometric Invariant", Proceedings Fifth International Conference on Computer Vision, Massachusetts Institute of Technology, Cambridge, Massachusetts, 480–487, (Jun. 20–23, 1995).

Smith, A.R., "Color Gamut Transform Pairs", Computer Graphics: A Quarterly Report on SIGGRAPH–ACM, 12, 12–19, (Aug. 1978).

Swain, M.J., et al., "Color Indexing", *International Journal of Computer Vision*, 7, 1991 Kluwer Academic Publishers, Manufactured in The Netherlands, 11–32, (1991).

Yeo, B., et al., "Rapid Scene Analysis on Compressed Video", *IEEE Transactions on Circuits and Systems for Video Technology*, 5, A Publication of the Circuits and Systems Society, 533–544, (Dec. 1995).

Yeo, B., et al., "Retrieving and Visualizing Video", Communications of the ACM, 40, 43–52, (Nov. 1997).

Yeung, M.M., et al., "Time–constrained Clustering for Segmentation of Video into Story Units", Proceedings of the 13th International Conference on Pattern Recognition, III, Sponsored by The International Association for Pattern Recognition, 375–380, (Aug. 25–29, 1996).

Yeung, M.M., et al., "Video Browsing using Clustering and Scene Transitions on Compressed Sequences", *SPIE*, 2417, 399–413, (Feb. 1995).

* cited by examiner

SYNTHESIZING COMPUTER INPUT EVENTS

FIELD OF THE INVENTION

This invention relates generally to computer input events, and more particularly to synthesizing such events.

BACKGROUND OF THE INVENTION

Computers today typically come with one or more input devices to enable users to input data into the computer. Such input devices include joysticks, mouses, and keyboards. An input event is thus a specific utilization of an input device. For example, moving the mouse, pressing a key on the keyboard, and clicking a button on the joystick, are all specific utilizations of input devices, and therefore are all input events.

While the use of input devices for computers make them easier to use, they are still nevertheless not necessarily the most intuitive manner by which computer input can be achieved. For example, computer games in which a player must navigate through a three-dimensional (3D) terrain may have their life-like quality marred by the fact that the player must utilize a joystick or a mouse (i.e., two-dimensional devices) to signal to the computer in which direction movement in three dimensions is desired. In other words, the use of input devices such as joysticks, computer mouses and keyboards may not be the most natural user interface for achieving computer input.

Therefore, there is a need for other methods by which computer input can be realized. Such other methods of input should be more intuitive than typical computer input devices allow. Perceptual user interfaces that user computer vision tracking of the user or users and speech recognition can provide for more intuitive computer input.

SUMMARY OF THE INVENTION

The invention relates to synthesizing computer input events. In one embodiment, a computerized system includes a sensor, a controller, a utility and an application. The sensor detects external events, such as audio events (e.g., speech or sounds as detected by a microphone) and video events (e.g., head movement of a user as detected by a video camera). The controller generates control variables in response to these external events. The utility then synthesizes input events, such as joystick, mouse, and keyboard events, from the control variables. The application thus utilizes these input events, as if they emanated from an input device such as a joystick, mouse or keyboard, itself. In addition to this embodiment, the invention includes other embodiments, including computerized systems, methods, computers, and computer-readable media of varying scope.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Figure 1:
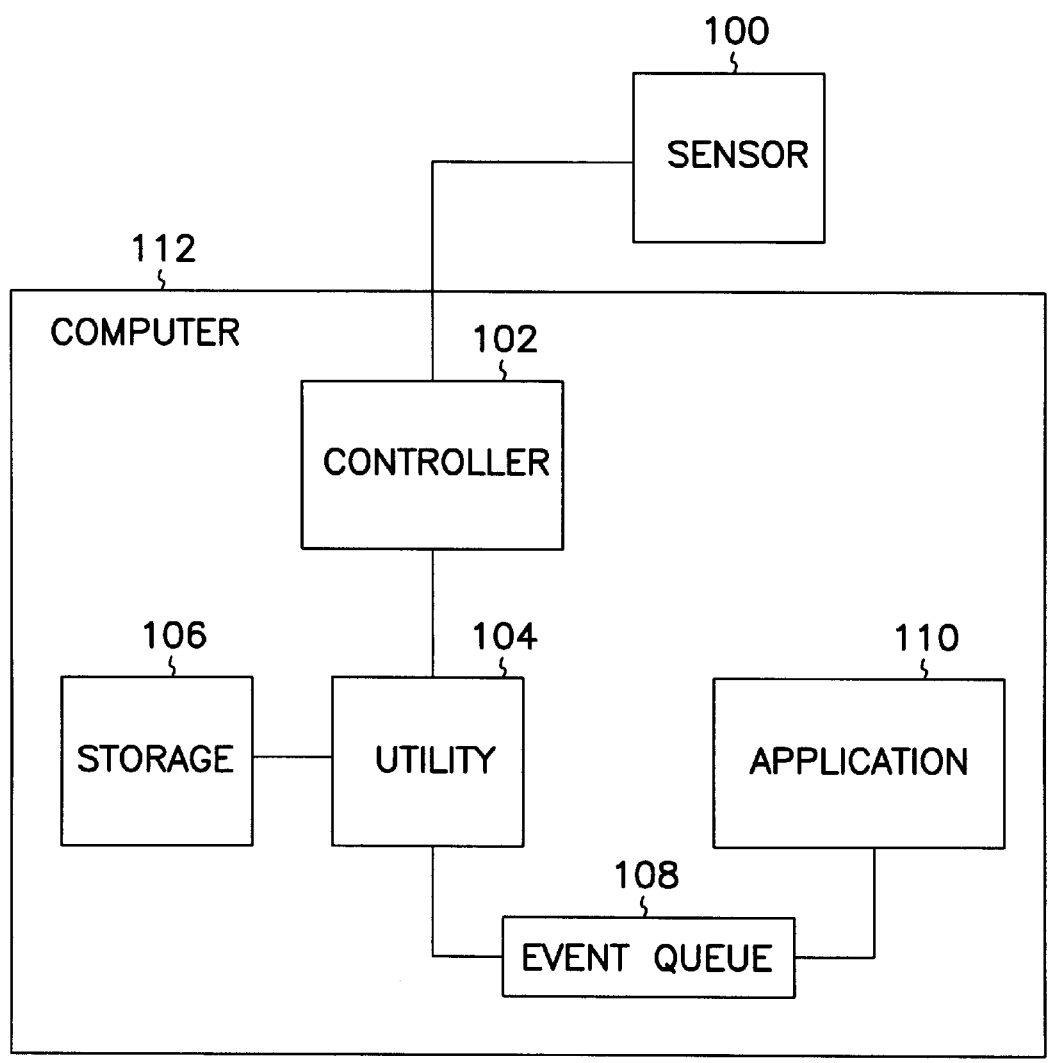
FIG. 1 shows a block diagram of a computerized system in accordance with an embodiment of the invention.

Referring first to FIG. 1, a block diagram of a computerized system according to one embodiment of the invention is shown. The computerized system of FIG. 1 includes a sensor 100, a controller 102, a utility 104, a storage 106, an event queue 108 and an application 110. As shown, the controller 102, the utility 104, the storage 106, the event queue 108, and the application 110 are desirably part of a computer 112, although the invention is not so limited. In such an embodiment, the controller 102, the utility 104, and the application 110 are all desirably computer programs running on the computer 112—i.e., programs (viz., a controller program, a utility program, and an application program) executed by a processor of the computer from a computer-readable medium such as a memory thereof. The computer 112 also desirably includes an operating system, not shown in FIG. 1, within which and in conjunction with which the programs run, as can be appreciated by those within the art.

The sensor 100 detects external events, such as audio events and video events. In one embodiment, the sensor 100 includes a microphone to detect audio events. These audio events may include spoken words, such as "move left," "move right, "stop," etc., or they may include sounds. In another embodiment, the sensor 100 includes a video camera to detect video events. These video events may include movement of an object, such as a computer user's head, tracked by the video camera. Such user movement that may be tracked by the video camera includes movement of the user's head in six degrees of freedom (X, Y, Z, roll, pitch and yaw), a human pose (full body or upper torso only), hand gestures, and facial gestures or emotions. Other objects that may be tracked include objects that are held in the user's hand or hands, such as an imitation gun, or a pencil.

The sensor 100 is operatively coupled to the computer 112 of which controller 102 is desirably a part. The invention is not limited to the manner by which the sensor 100 is so operatively coupled, however. Desirably, the sensor 100 is operatively coupled via a hardware card installed within the computer 112, via a Universal Serial Bus (USB) within the computer 112, as known within the art, or via other manners.

In response to the external events detected by the sensor 100, the controller 102 generates control variables. That is, the controller 102 takes the raw data regarding the external events as detected by the sensor 100, and converts them to control variables reflecting the external events that the raw data represents. For example, in the case of the sensor 100 including a microphone to detect audio events, the control variables may signify the words "Move Left" when the user has stated "Move Left," etc. As another example, in the case of the sensor 100 including a video camera to detect video events, the control variables may include the distance from a neutral position that the user's head has moved.

The invention is not limited to any particular manner by which the controller 102 generates control variables from the external events detected by the sensor 100. In the case of audio events, speech recognition software, such as that readily available within the art, may be used. In the case of video events, the invention described in the coassigned, cofiled, and copending application entitled "Control Variables Generation for Computer Vision," docket no. 884.005US1, may be utilized, such that the controller 102 corresponds to the driver 102 and the controller 104 of FIG. 1 of that application.

From the control variables generated by the controller 102, the utility 104 synthesizes input events. Such input events include joystick events, such as left, right, up, and down, mouse events, also such as left, right, up, and down, keyboard events, such as various keys or key sequences being pressed, and button events, such as one of the buttons of the joystick or mouse being pressed. Desirably, the utility 104, in the case where it is a computer program running on the computer 112, is a background application running in conjunction within an operating system of the computer 112.

To determine the appropriate input events to synthesize for use by the application 110, as will be later described, the utility 104 desirably accesses the storage 106 to determine parameters regarding the application 100. Such parameters may include, in the context of a multi-tasking computing environment, the actual active application 110 of all the applications running on the computer 112, as can be appreciated by those of ordinary skill within the art. The storage 106 may include a disk file in which such parameters are stored. In the case of versions of the Microsoft™ Windows™ operation system, the storage 106 may include the registry.

Furthermore, the utility 104 desirably is amenable to input events such as keyboard entry so that the user has a manner by which to adjust parameters regarding the utility 104 itself. For example, in the case of video events, the user is desirably able to manually adjust sensitivity and event rate, to re-zero the neutral position of the object tracked by the sensor 100, to pause and resume the synthesis of input events, and to exit the event synthesis, as can be appreciated by those of ordinary skill within the art. In addition, since faster computers typically respond to input events more quickly than slower computers—i.e., faster graphics rendering rates result in faster apparent movement, and vice-versa—desirably the utility 104 is able to adjust itself to the overall speed of the computer 112. For example, when the utility 104 is first run, the utility 104 may determine the speed of the computer 112, and adjust itself appropriately. In some instances, more complex computer graphic scenes render slower than simpler graphic scenes, which results in slower or faster apparent movement, respectively. Desirably, the utility 104 is able to also adjust for variations in graphic rendering rates.

In the embodiment of the invention shown in FIG. 1, the utility 104 enters the synthesized input event into the event queue 108, just as other generated input events (i.e., as generated by actual input devices such as keyboards, joysticks, and mouses) are inserted into the event queue 108 by the operating system of the computer 112 (not shown in FIG. 1). In conjunction with the insertion of the synthesized input event into the event queue 108, the utility 104 also desirably generates an interrupt, such as a hardware IRQ (interrupt request) to signify that an input event has been placed in the queue 108. The event queue 108 itself may be managed by the operating system of the computer 112. The invention is not limited to the presence or absence of an event queue 108, or whether or how an interrupt is generated, however.

Thus, in the embodiment of the invention shown in FIG. 1, ultimately the application 110 receives and utilizes the input events synthesized by the utility 104, either directly receiving it from the queue 108, or indirectly through an operating system of the computer 112. Desirably, the application 110 runs as a foreground application on the computer 112, in conjunction with the operating system thereof. The application 110 utilizes the input events synthesized by the utility 104 desirably as if they were "real" input events generated in response to actuation of an input device such as a joystick, mouse or keyboard.

For example, in the case of an application 110 that is a computer game, the synthesized input events may mimic the input events of a joystick input device. When the user states "move left," the utility 104 generates an input event representing the actuation of the joystick to the left, as if the joystick had actually been moved to the left. Thus, the application 110 may respond to the input event by moving the user's field of view to the left, in the case where the computer game is a flight simulator.

As has been described in conjunction with FIG. 1, the invention provides for advantages not found in the prior art. The invention provides for a more intuitive manner by which user input is achieved, in the cases where utilizing voice commands, or where head movement, are a more easy and realistic manner for the user to signify a desired action than actuation of a computer input device. This makes for a more natural user interface, enhancing the realism afforded by application programs running within a computer.

Figure 2:
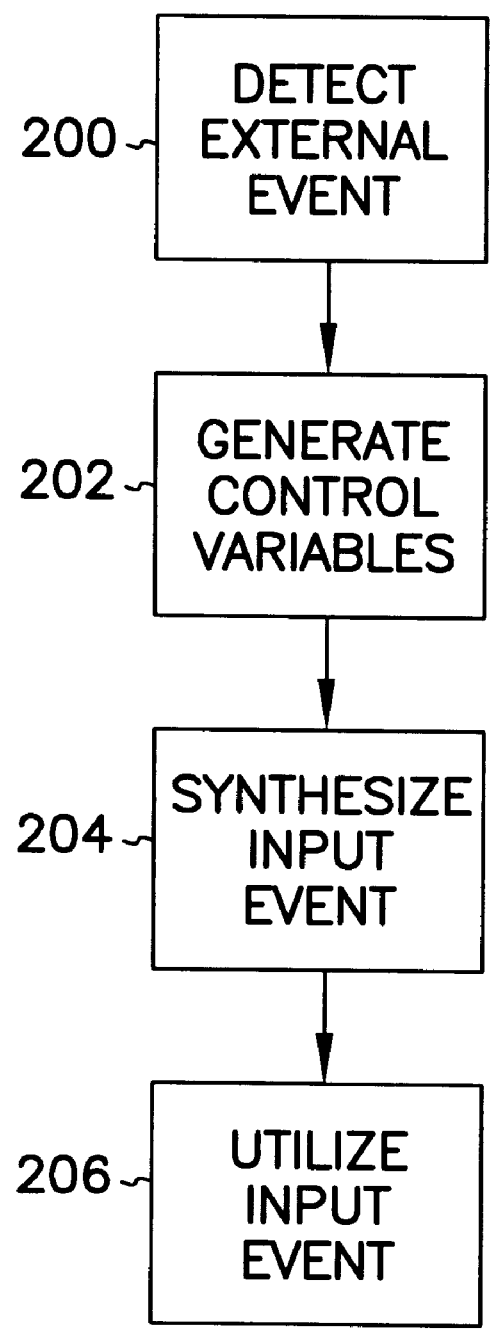
FIG. 2 shows a flowchart of a computerized method in accordance with an embodiment of the invention; and, FIG. 3 shows a diagram of a computer in conjunction with which embodiments of the invention may be practiced.

Referring next to FIG. 2, a flowchart of a computerized method in accordance with an embodiment of the invention is shown. The computerized method is desirably realized at least in part as one or more programs running on a computer—that is, as a program executed from a computer-readable medium such as a memory by a processor of a computer. The programs are desirably storable on a computer-readable medium such as a floppy disk or a CD-ROM, for distribution and installation and execution on another (suitably equipped) computer. The method of FIG. 2 is specifically the manner by which an external event is detected, and an input event is synthesized based thereon and utilized.

In step 200, an external event is detected. The event may be an audio event, such as a spoken word or a sound, or a video event, such as movement of an object like a user's head or hand. The event is desirably detected by a sensor, such as a microphone or a video camera.

In step 202, control variables are generated in response to the external event. That is, the raw data representing the external event are translated to control variables representing the external event. For example, if the user's head is moved to the left, the control variables representing this external event may signify the distance the user's had has moved relative to a neutral position. Desirably, the generation of the control variables is performed by a controller program running on a computer.

In step 204, an input event is synthesized based on the external event. More specifically, the input event is generated from the control variables generated in step 202. The input event is desirably a joystick event, a mouse event, a keyboard event, or a button event. The input event thus mimics the actuation of a corresponding input device. For example, in response to control variables representing the user having stated "Move Right" into the sensor, an input event may be synthesized to represent as if a joystick input device has actually been moved to the right. Desirably, the synthesis of the input event is performed by a utility program running on a computer in the background.

Finally, in step 206, the input event is utilized. Desirably, the input event is utilized by an application program running on a computer in the foreground. For example, in response to an input event synthesized to represent as if a joystick has been moved to the right, the field of view displayed by the application program may be panned to the right. Therefore, the synthesized input event is utilized as if the actual input event occurred.

Desirably, the input event synthesized in step 204 is appropriate to the specific utilization of such an event in step 206. This is accomplished by referencing parameters regarding the specific utilizations of input events, as such parameters are stored in a storage such as a disk file or the registry in the case of the Microsoft™ Windows™ operating system. Furthermore, desirably, the input event is placed in an event queue that may be administered by the operating system of a computer, and an appropriate interrupt-such as a hardware IRQ—is correspondingly generated.

Figure 3:
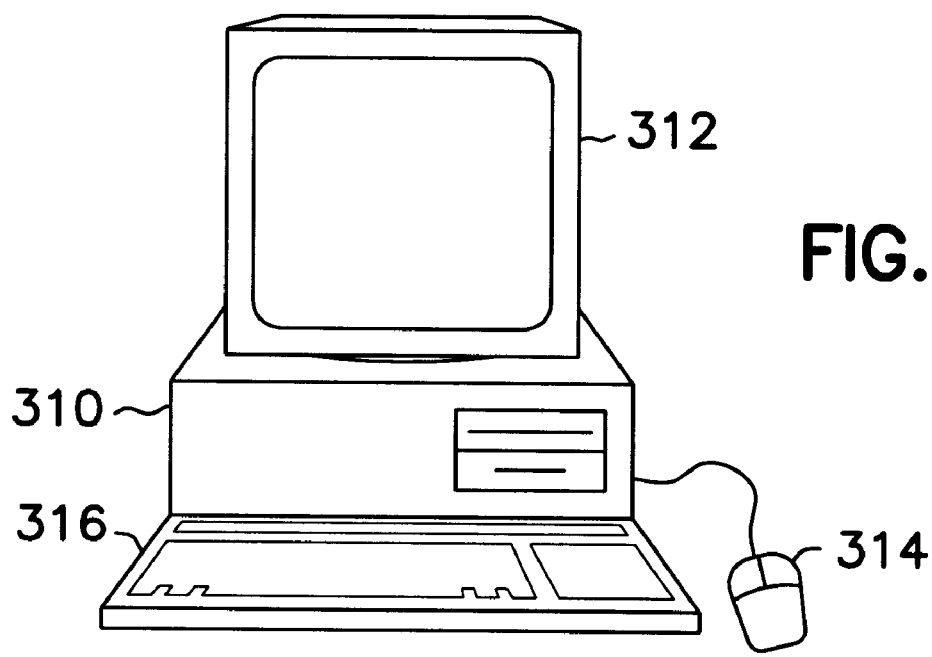

Referring finally to FIG. 3, a diagram of a representative computer in conjunction with which embodiments of the invention may be practiced is shown. Computer 310 is operatively coupled to monitor 312, pointing device 314, and keyboard 316. Computer 310 includes a processor (desirably, an Intel™ Pentium™ processor), random-access memory (RAM) (desirably, at least thirty-two megabytes), read-only memory (ROM), and one or more storage devices, such as a hard disk drive, a floppy disk drive (into which a floppy disk can be inserted), an optical disk drive, and a tape cartridge drive. The memory, hard drives, floppy disks, etc., are types of computer-readable media. The invention is not particularly limited to any type of computer 310. Computer 310 desirably is a PC-compatible computer, running a version of the Microsoft™ Windows™ operating system. The construction and operation of such computers are well known within the art.

Monitor 312 permits the display of information within a viewing area, including computer, video and other information, for viewing by a user of the computer. The invention is not limited to any particular monitor 312, and monitor 312 is one type of display device that may be used by the invention. Such monitors include cathode ray tube (CRT) displays, as well as flat panel displays such as liquid crystal displays (LCD's). Pointing device 314 permits the control of the screen pointer provided by the graphical user interface of operating systems such as versions of Microsoft™ Windows™. The invention is not limited to any particular pointing device 314. Such pointing devices include mouses, touch pads, trackballs, wheels, remote controls and point sticks. Finally, keyboard 316 permits entry of textual information into computer 310, as known within the art, and the invention is not limited to any particular type of keyboard.

Synthesis of computer input events have been described. In one embodiment, a computerized system includes a sensor, a controller, a utility and an application. The sensor detects external events, such as audio events and video events. The controller generates control variables in response to the external events. The utility synthesizes input events, such as joystick, mouse, and keyboard events, from the control variables. The application then utilizes these input events.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is manifestly intended that this invention be limited only by the following claims and equivalents thereof.

We claim:

1. A computerized system comprising:
   a sensor detecting external events selected from the group essentially consisting of audio events and video events;
   a controller generating control variables in response to the external events;
   a utility synthesizing input events from the control variables, wherein the input events comprise events selected from the group essentially consisting of: joystick events, mouse events, keyboard events and button events; and,
   an application utilizing the input events.

2. The computerized system of claim 1, wherein the utility accesses at least one of a disk file and a registry to determine parameters regarding the application to synthesize input events relevant to the application.

3. The computerized system of claim 1, wherein the utility inserts the input events in an event queue for the application to utilize the input events.

4. The computerized system of claim 1, wherein the utility generates an interrupt when synthesizing an input event.

5. The computerized system of claim 1, wherein the utility runs as a background application running in conjunction with an operating system and the application runs as a foreground application running in conjunction with the operating system.

6. The computerized system of claim 1, wherein at least one of the controller, the utility, and the application comprises a computer program running on a computer.

7. The computerized system of claim 1, wherein the sensor comprises a video camera detecting video events.

8. The computerized system of claim 7, wherein the video events comprise movement of an object tracked by the video camera.

9. The computerized system of claim 8, wherein the object comprises a head of a user.

10. The computerized system of claim 1, wherein the sensor comprises a microphone detecting audio events.

11. The computerized system of claim 10, wherein the audio events comprise spoken words detected by the microphone.

12. The computerized system of claim 10, wherein the audio events comprise sounds detected by the microphone.

13. A computerized system comprising:
    a sensor detecting external events selected from the group essentially consisting of audio events and video events;
    a controller generating control variables in response to the external events;
    a utility synthesizing from the control variables input events selected from the group essentially consisting of: joystick events, mouse events, keyboard events and button events;
    an application utilizing the input events in response to an interrupt generated by the utility when synthesizing an input event;
    a storage accessed by the utility to determine parameters regarding the application to synthesize input events relevant to the application; and,
    an event queue into which the input events synthesized by the utility are inserted by the utility for the application to utilize the input events.

14. The computerized system of claim 13, wherein the storage comprises at least one of a disk file and a registry.

15. A computerized method comprising:
   detecting an external event selected from the group essentially consisting of an audio event and a video event; and,
   synthesizing an input event based on the external event, the input event selected from the group essentially consisting of: a joystick event, a mouse event, a keyboard event and a button event.

16. The computerized method of claim 15, further comprising prior to synthesizing the input event, generating a control variable in response to the external event.

17. The computerized method of claim 16, wherein synthesizing the input event comprises generating the input event from the control variable.

18. The computerized method of claim 15, further comprising utilizing the input event.

19. The computerized method of claim 15, wherein the video event comprises movement of an object.

20. The computerized method of claim 15, wherein the audio event is selected from the group essentially consisting of a spoken word and a sound.

21. A computer comprising:
   a processor;
   a computer-readable medium; and,
   a utility program executed by the processor from the medium to synthesize input events from control variables generated in response to external events selected from the group essentially consisting of audio events and video events, wherein the input events comprise events selected from the group essentially consisting of: joystick events, mouse events keyboard events and button events.

22. The computer of claim 21, wherein the utility program runs as a background application in conjunction with an operating system.

23. The computer of claim 21, further comprising an application program executed by the processor from the medium to utilize the input events synthesized by the utility program.

24. The computer of claim 23, wherein the application program runs as a foreground application in conjunction with an operating system.

25. The computer of claim 21, further comprising a controller program executed by the processor from the medium to generate the control variables in response to the external events.

26. The computer of claim 21, wherein the external events are detected by a sensor operatively coupled to the computer.

27. A computer-readable medium having a utility program stored thereon for execution on a suitably equipped computer to synthesize input events from control variables generated in response to external events selected from the group essentially consisting of audio events and video events, wherein the input events comprise events selected from the group essentially consisting of: joystick events, mouse events, keyboard events and button events.

* * * * *